Sept. 29, 1936. N. SCHWARTZ 2,055,853
SEPARATOR FOR FILTER TYPE RESPIRATORS
Filed Aug. 20, 1935
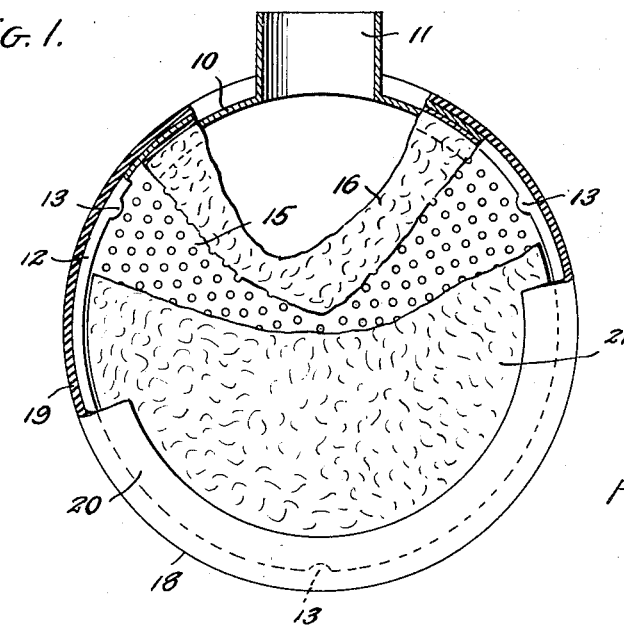
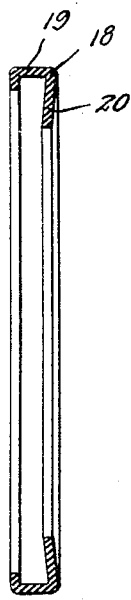
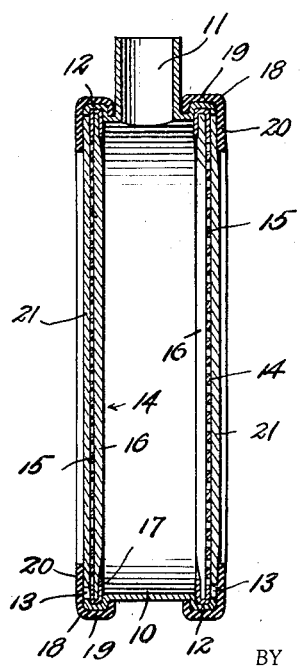
INVENTOR.
NATHAN SCHWARTZ
BY Clark & Ott
ATTORNEYS Patented Sept. 29, 1936

2,055,853

UNITED STATES PATENT OFFICE 2,055,853

SEPARATOR FOR FILTER TYPE RESPIRATORS

Nathan Schwartz, New York, N. Y.

Application August 20, 1935, Serial No. 36,957

6 Claims. (Cl. 183—45)

This invention relates to respirators, gas masks and the like and has particular reference to a filtering device or separator therefor having improved means for mounting one or more filter elements or filtration discs by virtue of which the same may be readily emplaced or removed therefrom.

The invention broadly provides a container or body defining an air chamber and having an outlet adapted for connection with the interior of a respirator, gas mask or the like and one or more flanged openings providing internal grooves for the reception of filter elements or disc arranged in said openings together with flexible elastic flanged elements encompassing the flanges of said openings for effectively sealing the juncture of the filter elements with the container and for retaining the same in the said grooves.

The invention further contemplates in an article of the character described, a non-deformable container or body having one or more flanged openings each defining an internal groove for the accommodation of a filter element or filtration disc in said openings respectively, and with a flexible elastic element encompassing the flange of each opening and having an inwardly directed flange overlying and engaging against the marginal portion of the filter elements for sealing the juncture thereof with the container.

As a further feature the invention includes an improved filtration assembly composed of a relatively rigid foraminous member or disc to the inner face of which a filter ply is secured, with a separate filter ply adapted to be arranged over the outer face thereof, whereby, when the assembly is arranged within the groove of the body or container, the separate filter ply may be removed and replaced without disturbing the other member of the filter assembly.

With these and other objects in view the invention is illustrated in the accompanying drawing in which there is disclosed the preferred embodiment of the invention while the appended claims cover variations and modifications thereof which fall within their scope.

In the drawing:

Fig. 1 is a face view of a filtering device or separator of the character set forth with the parts broken away and shown in section to disclose the underlying structure.

Fig. 2 is a sectional view therethrough taken approximately on a plane indicated by the line 2—2 in Fig. 1.

Fig. 3 is a cross sectional view through one of the flexible elastic retaining and sealing elements removed from the body of the filter device.

Referring to the drawing by characters of reference, 10 designates a hollow body or container which is adapted to be attached to the face piece of a respirator, gas mask or the like for establishing communication with the interior thereof by means of a tubular stem 11 or other equivalent means of connection. The body or container is provided with one or more air inlet openings, two being shown in the present instance located in opposite faces thereof and defined or framed by continuous channel-shaped flanges 12 providing internal grooves, the outer free inturned edges of which flanges are provided with radial inwardly directed teats 13.

Filter devices 14 are adapted to be removably arranged in the grooves of said flanges 12 behind the teats 13 to cover the air inlet openings and said filter devices as illustrated each include a perforated or foraminous disc 15, preferably of metal or an equivalent substantially rigid material with filter ply 16 secured to the inner face thereof in any desired manner such as by spinning the marginal edge 17 over said ply.

In order to assist in the retention of the filter devices within the air inlet openings and to seal the same at their juncture with the body or container 10, flexible elastic bands 18 are employed, each of which includes a continuous channel-shaped wall 19 adapted to encompass the flange 12 and an inwardly directed flange 20 adapted to overlie and engage against the marginal portion of the filter device. In addition to the filter device 14 a separate filter ply 21 may be arranged over the outer face of the foraminous member or of each of said devices between the same and the flange 20 of the band 18. The elastic nature of the bands 18 permit of their engagement with and their disengagement from the flanges 12 so that the filter devices and the plies 21 may be readily emplaced in the body or removed therefrom. This construction also allows for the removal and replacement of said separate outer filter plies 21 without necessitating the removal and replacement of the flexible elastic band 18 or the filter device 14.

In order to insure the proper sealing engagement of the flanges 20 of the bands 18 with the filter devices 14 or plies 21, said flanges 20 are normally inclined inwardly as illustrated in Fig. 3 so as to place the same under tension against the filter devices or plies 21 when they are in active use.

What is claimed is:

1. A separator for filter type respirators including a container having an air outlet for communication with the respirator and provided with an opening in one face thereof with an internal annular seat extending about the periphery of the said opening, a disc-like filter element arranged in said seat and a flexible elastic element encompassing the container adjacent the opening and with an inwardly directed flange overlying and engaging against the marginal portion of the filter element for sealing the same at its juncture with the container.

2. A separator for filter type respirators including a container having an air outlet for communication with the respirator, one of the walls of said container having an opening and an inwardly directed flange providing an internal annular seat, a disc-like filter element arranged in said opening with its marginal edge engaging said seat and a flexible elastic element encompassing the flange of said opening for sealing the juncture of the filter element with the container and for removably retaining the same in position engaging said seat.

3. A separator for filter type respirators including a hollow body having an air outlet for communication with the respirator, one of the walls of said body being provided with an air inlet opening, a disc-like filter unit arranged in said opening, and means securing the filter unit in position in said opening, said means including a flexible elastic element having an inwardly directed extension overlying and engaging against the marginal portion of the outer face of said unit.

4. A separator for filter type respirators including a rigid tubular body having an air inlet for communication with the respirator and a channeled edge defining an internal seat and an external bead, a disc-like filter element adapted to be arranged in engagement with said seat, and means for removably securing said element in engagement with said seat comprising an elastic band having a cross sectionally channel-shaped body contractively fitting over the bead and an inwardly directed resilient flange engaging against the outer side of the filter element at its margin.

5. A separator for filter type respirators including a rigid tubular body having an air inlet for communication with the respirator and a channeled edge defining an internal seat and an external bead, a disc-like filter element adapted to be arranged in engagement with said seat, and means for removably securing said element in engagement with said seat comprising an elastic band having a cross sectionally channel-shaped body contractively fitting over the bead and an inwardly directed resilient flange engaging against the outer side of the filter element at its margin, said flange being normally inclined inwardly to resiliently impinge against the marginal portion of the filter element.

6. A device including a body having a port at one end thereof, a filter disc adapted to be arranged within said port, and means for removably retaining said filter disc in associated relation therewith comprising a molded elastic material defining an annular grooved base to accommodate the margin of said disc and an inwardly directed flange normally disposed at an acute angle with reference to said base and adapted to impinge against the filter disc to resiliently retain and seal the same in place.

NATHAN SCHWARTZ.